United States Patent
Kim

(10) Patent No.: US 8,927,136 B2
(45) Date of Patent: Jan. 6, 2015

(54) BATTERY COVER INSULATOR SYSTEM FOR FLUID COMMUNICATION WITH BATTERY VENTS

(75) Inventor: Myung-Chul Kim, Yongin-si (KR)

(73) Assignees: Samsung SDI Co., Ltd., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 252 days.

(21) Appl. No.: 13/337,701

(22) Filed: Dec. 27, 2011

(65) Prior Publication Data

US 2012/0328918 A1    Dec. 27, 2012

Related U.S. Application Data

(60) Provisional application No. 61/500,304, filed on Jun. 23, 2011.

(51) Int. Cl.
  *H01M 6/42* (2006.01)
  *H01M 2/12* (2006.01)
  *H01M 10/04* (2006.01)

(52) U.S. Cl.
  CPC .......... *H01M 2/1217* (2013.01); *H01M 2/1252* (2013.01); *H01M 6/42* (2013.01); *H01M 10/04* (2013.01)
  USPC ............................................. 429/149; 429/82

(58) Field of Classification Search
  CPC ... H01M 2/1217; H01M 6/42; H01M 2/0245; H01M 2/1016; H01M 10/04; H01M 2220/20; Y02E 60/122
  USPC ................ 429/82, 83, 87, 149, 153, 154, 158
  See application file for complete search history.

(56) References Cited

U.S. PATENT DOCUMENTS

| | | |
|---|---|---|
| 6,410,177 B1 | 6/2002 | Iyasu et al. |
| 2007/0134524 A1 | 6/2007 | Cho et al. |
| 2007/0218351 A1 | 9/2007 | Boerner et al. |
| 2012/0164490 A1 | 6/2012 | Itoi et al. |

FOREIGN PATENT DOCUMENTS

| | | | |
|---|---|---|---|
| DE | 8414397 U1 | 9/1985 | |
| EP | 1091431 | * 4/2001 | ............ H01M 2/12 |
| EP | 1091431 A2 | 4/2001 | |
| KR | 10-0726503 | 6/2007 | |
| KR | 10-2009-0017825 A | 2/2009 | |
| KR | 10-2009-0128602 A | 12/2009 | |
| WO | WO 2009/128214 A1 | 10/2009 | |
| WO | WO 2011/033713 A1 | 3/2011 | |

OTHER PUBLICATIONS

European Office Action dated Oct. 17, 2012.

* cited by examiner

*Primary Examiner* — Raymond Alejandro
(74) *Attorney, Agent, or Firm* — Lee & Morse, P.C.

(57) ABSTRACT

A battery module is provided that includes a plurality of battery cells. Each battery cell can include a vent. A cover encloses the vents, and an insulation member is located between the plurality of battery cells and the cover. The insulation member can include a bent part that sealably engages the cover. The plurality of battery cells can be arranged in a first direction such that the vent of each battery cell is aligned with the vent of an adjacent battery cell. The cover and the insulating member can extend in the first direction to enclose the vents.

16 Claims, 4 Drawing Sheets

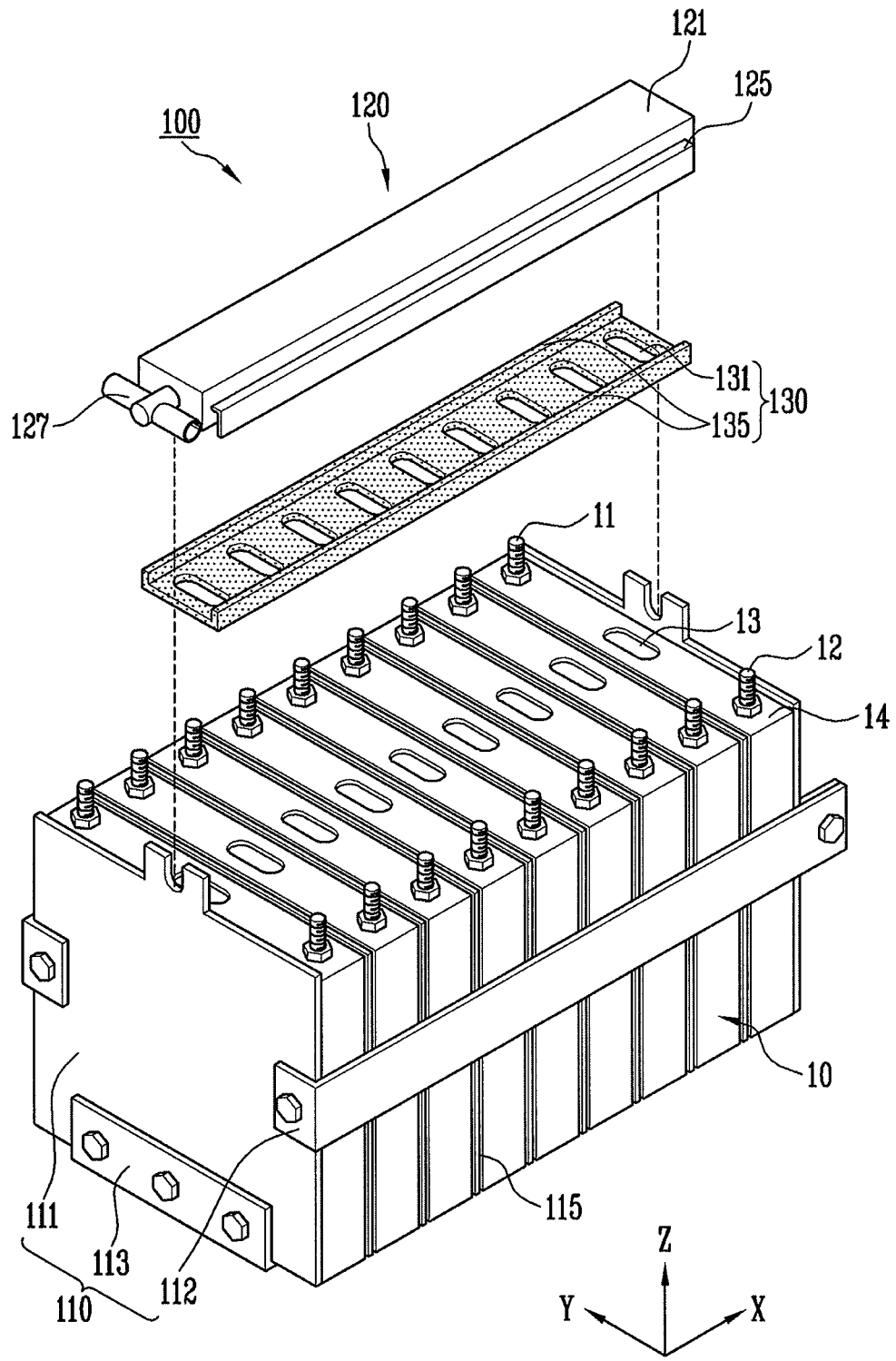

# BATTERY COVER INSULATOR SYSTEM FOR FLUID COMMUNICATION WITH BATTERY VENTS

CROSS-REFERENCE TO RELATED APPLICATION

The present application claims priority under 35 U.S.C. §119(e) to U.S. Provisional Application No. 61/500,304, filed on Jun. 23, 2011, and entitled: "Battery Module," which is incorporated herein by reference in its entirety.

BACKGROUND

1. Field

Exemplary embodiments relate to a battery module including a plurality of battery cells.

2. Description of the Related Art

In a high-output battery module using a non-aqueous electrolyte with a high energy density, a plurality of battery cells are connected in series to constitute a high-capacity battery module for apparatuses requiring high power, e.g., for a motor of an electric car.

A battery cell includes an electrolyte and an electrode assembly formed of a positive plate and a negative plate and generates energy by electrochemical reaction between the plates and the electrolyte. Gas may be generated in the battery cells due to side reactions of the electrochemical reaction.

SUMMARY

According to an embodiment, there is provided a battery module, including a plurality of battery cells, each battery cell including a vent, a cover enclosing the vent, and an insulation member between the battery cell and the cover, wherein the insulation member includes a bent part that sealably engages the cover.

The may cover sealably engage the insulation member to form a gas-tight space between the cover and the battery cell.

The cover may include a body part and an accommodating part, the accommodating part accommodating the bent part.

The bent part may be accommodated by press-fit engagement between the accommodating part and a sidewall of the body part.

The cover may include at least one rib extending from an inward-facing side of the body part.

The rib may include a contact part that presses the insulation member and a non-contact part that does not contact the insulation member.

The insulation member may be a heat resistant, elastic material.

According to an embodiment, there is provided a battery module, including a plurality of battery cells, each battery cell including a vent, a cover enclosing the vent, and an insulation member between the battery cell and the cover, wherein the battery cells are arranged in a first direction such that the vent of each battery cell is aligned with the vent of an adjacent battery cell to provide a plurality of vents aligned in the first direction, the cover and the insulating member extend in the first direction to enclose the vents, and the insulation member includes a bent part sealably engaging the cover.

The insulation member may be a single body extending between adjacent ones of the battery cells.

The insulation member may include openings, each of the openings corresponding to one of the vents.

The vents may be disposed in cap plates of the battery cells. The insulation member may contact the cap plates in sealing engagement therewith.

The bent part may extend in a second direction away from the cap plates, the second direction being perpendicular to the first direction.

The cover may include a gas outlet at one end thereof.

The bent part may extend in the first direction. The cover may include a body part and an accommodating part, the body part and the accommodating part extending in the first direction, the accommodating part accommodating the bent part by press-fit engagement with the accommodating part.

The accommodating part may be on an inside or an outside of the cover along the first direction.

The cover and the insulation member may be a pre-assembled unit.

The cover may include at least one rib extending inwardly toward the battery cells from an inward-facing side of the body part and extending in the first direction.

The rib may include a contact part that presses the insulation member and a non-contact part that does not contact the insulation member.

The non-contact part may correspond to the openings of the insulation member.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates an exploded perspective view of the battery module of FIG. 1;

DETAILED DESCRIPTION

Figure 1:
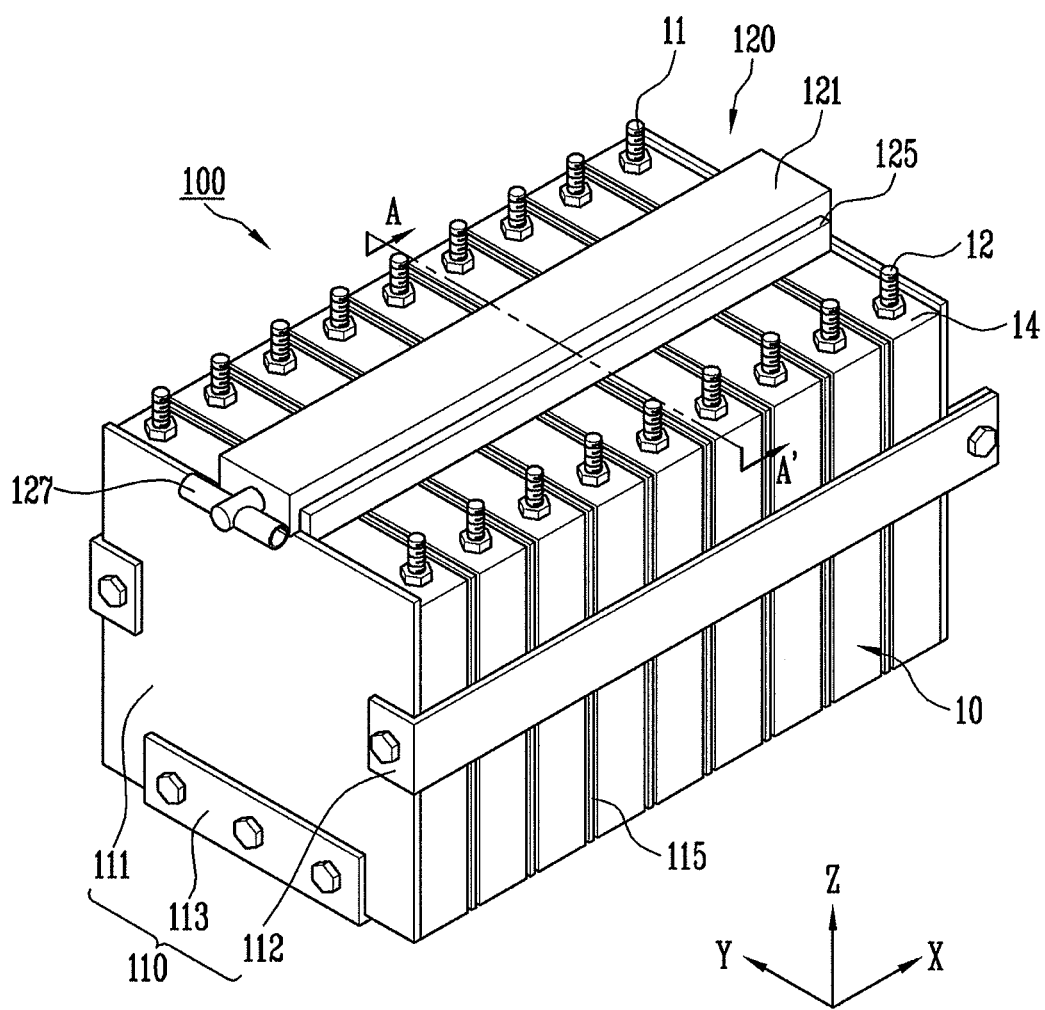
FIG. 1 illustrates a perspective view of a battery module according to one exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 3A:
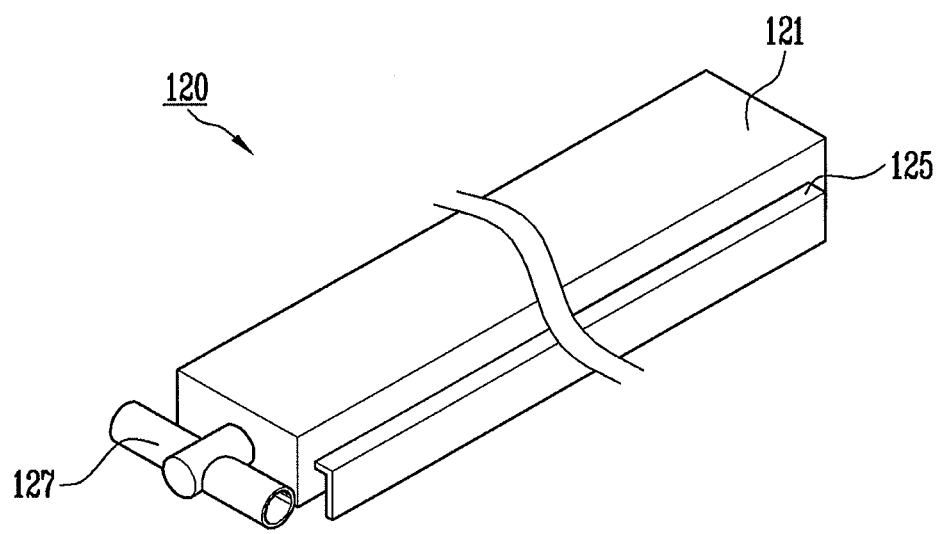
FIG. 3A illustrates an enlarged perspective view of a cover of FIG. 1.
Figure 3B:
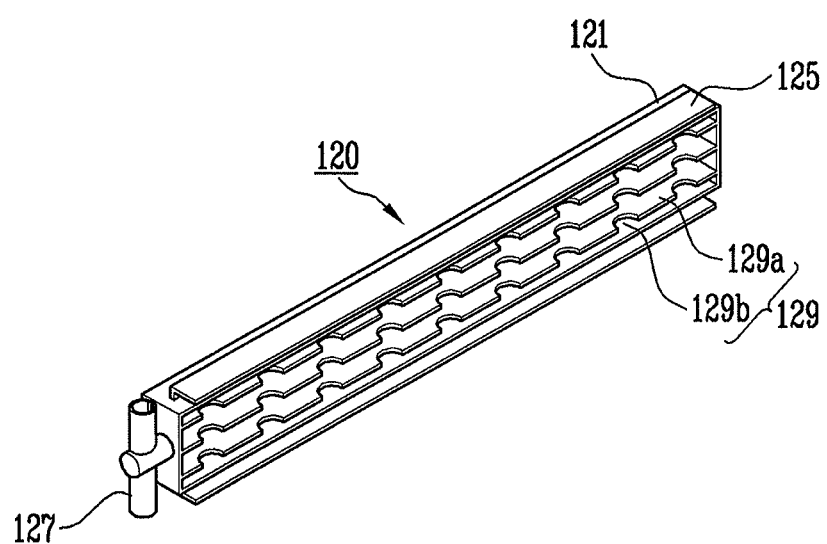
FIG. 3B illustrates a perspective view of the cover of FIG. 1 which is turned.
Figure 4A:
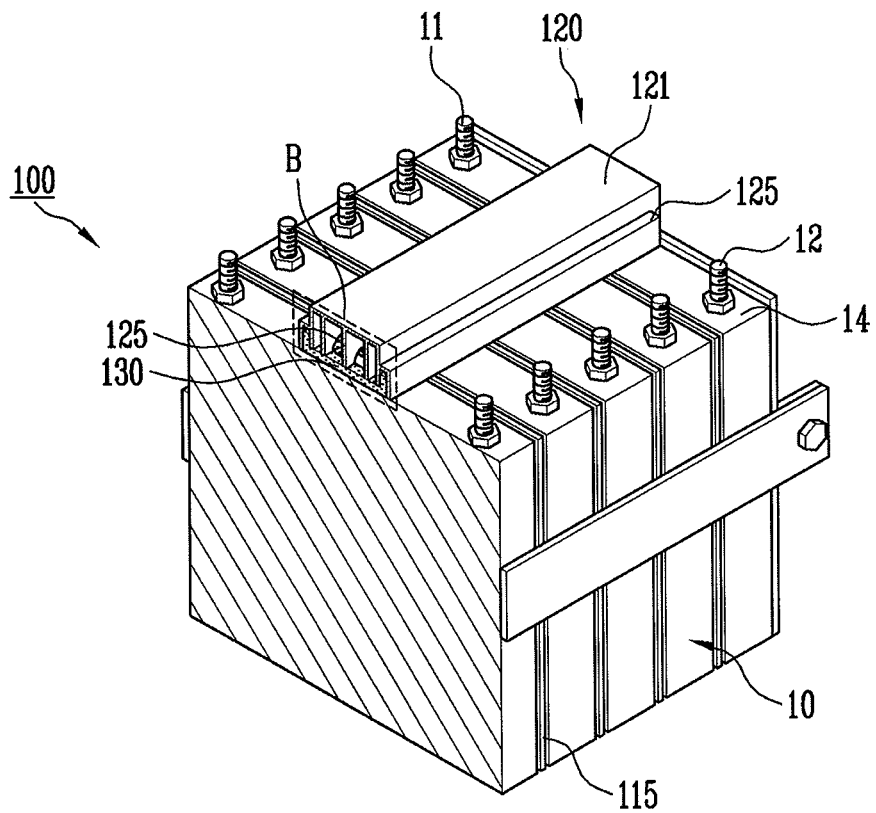
FIG. 4A illustrates a cross-sectional view taken along line A-A' of FIG. 1.
Figure 4B:
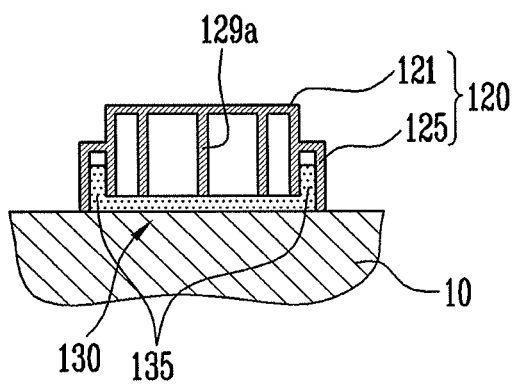
FIG. 4B illustrates an enlarged view of a portion B of FIG. 4A.

FIG. 1 is a perspective view of a battery module according to one exemplary embodiment, FIG. 2 is an exploded perspective view of the battery module of FIG. 1, FIG. 3A is an enlarged perspective view of a cover of FIG. 1, FIG. 3B is a perspective view of the cover of FIG. 1 which is turned, FIG. 4A is a cross-sectional view taken along line A-A' of FIG. 1, and FIG. 4B is an enlarged view of a portion B of FIG. 4A.

Referring to FIGS. 1 to 3A, the battery module 100 according to the present embodiment includes a plurality of battery cells 10, each battery cell 10 including a vent 13. The battery cells 10 may be arranged in one direction. A cover 120 encloses the vent 13. The cover may include a body part 121, and an accommodating part 125 formed on at least a portion of the body part 121. An insulation member 130 is disposed between the battery cell 10 and the cover 120. The insulating member 130 may correspond to the vent 13 and may include a bent part 135 accommodated in the accommodating part 125.

The accommodating part 125 may be formed on an outside of the cover 120 along a lengthwise direction of the cover 120, and the bent part 135 of the insulation member 130 may be accommodated in the accommodating part 125. The bent part 135 of the insulation member 130 may be formed by bending part of the insulation member 130 in a z-axis direction. In the present embodiment, the accommodating part 125 is formed on the outside of the cover 120, but embodiments are not limited thereto. For example, the accommodating part 125 may be formed inside the cover 120.

The insulation member 130 may be formed of at least one material selected from rubber, silicone, and an elastic material. The bent part 135 of the insulation member 130 may be forcibly inserted and closely fit into the accommodating part 125 of the cover 120 and accommodated in the accommodating part 125, affording no space. The bent part 135 may be accommodated by press-fit engagement between the accommodating part 125 and a sidewall of the body part 121. Accordingly, gas tightness of the insulation member 130 and the cover 120 may be secured to prevent gas discharged from the battery cells 10 from leaking to the outside, and a gas-tight space is formed between the cover and the battery cell. Further, the insulation member 130 and the cover 120 may be assembled in advance. Accordingly, an assembly process of the battery module 100 may be simplified. In detail, alignment of the vent 13 of the battery cells 10 and the insulation member 130 may be facilitated, thereby improving assembly efficiency of the battery module 100.

Referring to FIGS. 2 to 4B, the body part 121 of the cover 120 may have a hexahedral shape, an inward side of which is open in one direction, and is seated on the battery cells 10 such that the open side of the body part 121 faces the vent 13. The body part 121 of the cover 120 may include an outlet 127 for gas at one end and the body part 121 may be closely in contact with the insulation member 130 to form a gas passage connected to the outlet 127.

At least one rib 129 may be formed on the open inward side of the body part 121 of the cover 120. The rib 129 may be formed in a lengthwise direction of the body part 121 and may include a contact part 129*a* in contact with the insulation member 130 and the non-contact part 129*b* that provides an opening corresponding to the vent 13. The cover 120 may have a shape nearly corresponding to the insulation member 130.

When the rib 129 is formed on the open inward side of the body part 121 of the cover 120, gas tightness of the cover 120 and the insulation member 130 is further improved. In detail, the non-contact part 129*b* of the rib 129 may be formed corresponding to an opening 131 of the insulation member 130, and the contact part 129*a* may be in contact with the insulation member 130 between the openings 131 to press the insulation member 130. That is, the non-contact part 129*b* of the rib 129 does not disturb gas discharge from the opening 131 of the insulation member 130 corresponding to the vent 13, and the contact part 129*a* of the rib 129 is in contact with the insulation member 130 between the openings 131 while pressing the insulation member 130, thereby improving gas tightness of the cover 120 and the insulation member 130.

The insulation member 130 is disposed between the cover 120 and the battery cells 10. The vents 13 of the battery cells 10 may include cap plates, and the insulation member 130 may contact he cap plates in sealing engagement therewith. The bent part 135 of the insulation member 130 may be accommodated in the accommodating part 125 of the cover 120, and the remaining portion of the insulation member 130 other than the bent part 135 may be in contact with the contact part 129*a* of the rib 129, being pressed thereby. The cover 120 covering the insulation member 130 may be in close contact with the insulation member 130 to maintain gas tightness of the gas passage. Further, the insulation member 130 may further include the opening 131 corresponding to the vent 13 of the battery cells 10, and the rib 129 may include the non-contact part 129*b* that is open corresponding to the vent 13. Accordingly, gas discharge from the battery cells 10 is not disturbed.

According to the present embodiment, gas tightness of the insulation member 130 and the cover 120 may be secured, thereby preventing gas discharged from the battery cells 10 from leaking to the outside. Further, the insulation member 130 and the cover 120 may be assembled in advance. The assembly process of the battery module 100 may be simplified. In detail, alignment of the vent 13 of the battery cells 10 and the insulation member 130 may be facilitated to improve the assembly efficiency of the battery module 100.

The battery cells 10 may generate gas due to byproducts of electrode plates and an electrolyte with repeated charge and discharge, and such gas may be discharged through the vent 13. The gas may be discharged to the outside through the outlet 127 formed in the cover 120. The outlet 127 may have a T shape, left and right sides of which are open so that the gas does not affect neighboring battery modules 100, but is not limited thereto.

The insulation member 130 may be formed in a single body. Battery cells typically generate heat with repeated charge and discharge. The plurality of battery cells 10 may emit high-temperature heat sufficient to melt an insulation member that is mounted on the battery cells 10 and that is not formed of a heat resistant material. If the insulation member 130 were to melt, sealing efficiency between the insulation member 130 and the cover 120 could be reduced, so that gas could leak. Accordingly, the insulation member 130 may be a gasket formed of a heat resistant material to prevent gas leakage.

An exterior case of the battery cells 10 may be formed of metal, and the cover 120 may be formed of a plastic resin. Here, if the battery cells 10 and the cover 120 were to be in direct contact with each other, contact would not be easy due to the difference in the materials of the battery cells 10 and the cover 120, and thus gas could leak in an insecure contact part. The insulation member 130 may serve as a gasket between the battery cells 10 and the cover 120 to conveniently maintain gas tightness between the battery cells 10 and the cover 120.

The insulation member 130 formed in the single body may seal a plurality of vents 13 of the battery cells 10 at the same time. The insulation member 130 may include a plurality of openings 131 corresponding to the vents 13.

Each of the battery cells 10 may include a battery case having an open part and a cap plate 14 covering the open part. The battery case may accommodate an electrolyte and an electrode assembly formed of a positive plate, a negative plate, and a separator disposed between the plates. The cap plate 14 may include a positive electrode 11 connected to the positive plate and a negative electrode 12 connected to the negative plate, the electrodes being at opposite end portions and protruding to the outside. The positive plate and the negative plate constituting the electrode assembly may react with the electrolyte to generate energy, which may be transmitted to the outside through the positive electrode 11 and the negative electrode 12.

Further, the vent 13 may be disposed between the positive electrode 11 and the negative electrode 12 of the cap plate 14 to serve as a passage for gas to be discharged from the battery cells 10 when pressure of gas generated in the battery cells 10 is equal to or greater than a predetermined level. Thus, the vent 13 may prevent damage of the battery cells 10 due to internal pressure.

In the present embodiment, the battery cells 10 may be arranged in one direction. The battery cells 10 may be arranged parallel to each other, with wider front sides facing each other. The vents 13 may be positioned in a center portion of the battery cells 10 and disposed in a nearly straight line along the arranged battery cells 10. The positive electrodes 11 and the negative electrodes 12 of two neighboring battery cells 10 may be electrically connected to each other through a metal bus-bar (not shown).

A housing 110 may include a pair of end plates 111 spatially spaced from each other in one direction and a plurality of connecting members connecting the end plates 111. The connecting members may include a side bracket 112 connecting lateral sides of the end plates 111 and a bottom bracket 113 connecting bottom sides of the end plates 111. The plurality of battery cells 10 may be accommodated between the end plates 111.

The end plates 111 may be disposed to be in surface contact with outermost battery cells 10, respectively, and press the plurality of battery cells 10 inwardly. Further, the side bracket 112 may be connected to one end portion and the other end portion of the end plates 111 to support opposite lateral sides of the battery cells 10. Bottom sides of the battery cells 10 may be supported by the bottom bracket 113, and opposite end portions of the bottom bracket 113 may be connected to the end plates 111.

The plurality of battery cells 10, supported by the end plates 111, the side bracket 112, and the bottom bracket 113, may be arranged therein with the positive electrodes 11 and the negative electrodes 12 being disposed alternately and connected in series using bus-bars. A connection structure and the number of battery cells 10 may be changed variously depending on a design of the battery module 100.

A barrier 115 may be interposed between neighboring battery cells 10. A spacer (not shown) may be provided to the barrier 115 so as to space apart the neighboring battery cells 10 from each other and to form a space between the battery cells 10.

By way of summation and review, a battery module may have a gas passage or outlet to efficiently deal with gas generated in a plurality of battery cells. According to one exemplary embodiment, there is provided a battery module which secures tightness of gas generated in a plurality of battery cells due to a simplified working process, thereby preventing gas discharged from the battery cells from leaking to the outside.

Further, the battery module may have a simplified assembly process. An insulation member and a cover may be assembled in advance.

In addition, alignment of a vent and the insulation member may be facilitated.

Assembly efficiency of the battery module may be improved.

In the present embodiment, a polygonal lithium ion secondary battery may be illustrated as an example of the battery cell, but embodiments are not limited thereto. Various types of batteries, such as a lithium polymer battery, or various shapes, such as a cylindrical battery may be used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells, each battery cell including a vent such that the plurality of battery cells includes a plurality of vents;
a cover including a pair of accommodating parts and a body part between the pair of accommodating parts, the body part enclosing the plurality of vents; and
an insulation member between the plurality of battery cells and the cover, wherein the insulation member includes a pair of bent parts that sealably engage the cover and extend toward the cover, and the insulation member includes openings between the pair of bent parts, each of the openings corresponding to one of the vents, wherein respective accommodating parts accommodate respective bent parts, wherein the cover includes a gas outlet at one end thereof, and wherein the gas outlet has a T shape and two openings including an opening at the end of each arm of the T.

2. The battery module as claimed in claim 1, wherein the cover sealably engages the insulation member to form a gas-tight space between the cover and the plurality of battery cells.

3. The battery module as claimed in claim 1, wherein the respective bent part is accommodated by press-fit engagement between the respective accommodating part and a respective sidewall of the body part.

4. The battery module as claimed in claim 1, wherein the cover includes at least one rib extending from an inward-facing side of the body part.

5. The battery module as claimed in claim 4, wherein the rib includes a contact part that presses the insulation member and a non-contact part that does not contact the insulation member.

6. The battery module as claimed in claim 2, wherein the insulation member is a heat resistant, elastic material.

7. A battery module, comprising:
a plurality of battery cells, each battery cell including a vent such that the plurality of battery cells includes a plurality of vents;
a cover including a pair of accommodating parts and a body part between the pair of accommodating parts, the body part enclosing the plurality of vents; and
an insulation member between the battery cell and the cover, wherein:
the plurality of battery cells are arranged in a first direction such that the vent of each battery cell is aligned with the vent of an adjacent battery cell to provide the plurality of vents aligned in the first direction,
the cover and the insulating member extend in the first direction to enclose the vents, the insulation member includes a pair of bent parts sealably engaging the cover, extending toward the cover, and the insulation member includes openings between the pair of bent parts, each of the openings corresponding to one of the vents, wherein respective accommodating parts accommodate respective bent parts, wherein the cover includes a gas outlet at one end thereof, and wherein the gas outlet has a T shape and two openings including an opening at the end of each arm of the T.

8. The battery module as claimed in claim 7, wherein the insulation member is a single body.

9. The battery module as claimed in claim 7, wherein
the vents are disposed in cap plates of the plurality of battery cells,
the insulation member contacts the cap plates in sealing engagement therewith.

10. The battery module as claimed in claim 9, wherein the pair of bent parts extend in a second direction away from the cap plates, the second direction being perpendicular to the first direction.

11. The battery module as claimed in claim 7, wherein:
the pair of bent parts extend in the first direction, and the body part and the pair of accommodating parts extend in the first direction, the pair of accommodating parts accommodating the pair of bent parts by press-fit engagement with the pair of accommodating parts.

12. The battery module as claimed in claim 11, wherein the pair of accommodating parts is on an inside or an outside of the cover along the first direction.

13. The battery module as claimed in claim 11, wherein the cover and the insulation member are a pre-assembled unit.

14. The battery module as claimed in claim 11, wherein the cover includes at least one rib extending inwardly toward the battery cells from an inward-facing side of the body part and extending in the first direction.

15. The battery module as claimed in claim 14, wherein the rib includes a contact part that presses the insulation member and a non-contact part that does not contact the insulation member.

16. The battery module as claimed in claim 15, wherein the non-contact part corresponds to the openings of the insulation member.

* * * * *